United States Patent [19]
Fuse et al.

[11] Patent Number: 5,325,650
[45] Date of Patent: Jul. 5, 1994

[54] APPARATUS FOR CONTROLLING TRAVELING OF MOWER

[75] Inventors: Shinya Fuse; Hironori Kato; Naoki Kinoshita; Akio Noji; Tadashi Shimada; Toshikazu Nakamura, all of Saitama, Japan

[73] Assignee: Honda Giken Kogyo Kabushiki Kaisha, Tokyo, Japan

[21] Appl. No.: 962,503

[22] Filed: Oct. 15, 1992

[30] Foreign Application Priority Data

Oct. 31, 1991 [JP] Japan ................................. 3-311332
Nov. 5, 1991 [JP] Japan ................................. 3-315183

[51] Int. Cl.⁵ ..................... A01D 75/28; A01D 61/00
[52] U.S. Cl. ..................... 56/10.2; 56/10.5; 56/16.6; 56/DIG. 15
[58] Field of Search ............... 56/10.2, 10.3, 10.5, 56/10.6, 16.6, 202, DIG. 15

[56] References Cited

U.S. PATENT DOCUMENTS

| | | | |
|---|---|---|---|
| 3,863,428 | 2/1975 | Baxter | 56/10.2 R |
| 4,228,636 | 10/1980 | Homburg | 56/10.2 R |
| 4,765,190 | 8/1988 | Strubbe | 56/10.2 X |
| 4,964,266 | 10/1990 | Kolb | 56/16.6 X |
| 4,981,011 | 1/1991 | Olejak | 56/10.2 R |
| 5,060,459 | 10/1991 | Herron | 56/10.2 R |

Primary Examiner—Timothy V. Eley
Attorney, Agent, or Firm—Pollock, VandeSande and Priddy

[57] ABSTRACT

An apparatus for controlling the traveling of a mower comprising means for detecting the conveying state of cut grass in a shooter, and means for decelerating the traveling speed of the working machine while continuing the mowing work by the cutter and the feeding of an air flow to the shooter if the conveying state is more degraded than a jam prevention judgment criterion on the basis of the detection signal of the conveying state detector means. The conveying state of grass in the shooter is detected based on the density or amount of cut grass passing through the shooter per unit time, and the mower is decelerated while maintaining the rotation of the cutter blade for mowing and/or the feeding of the air flow into the shooter if the density exceeds a predetermined threshold value. A threshold value can be adjusted according to the condition of the grass to be cut; for example, high, degree of overgrowth, degree of dry or wet of the grass.

16 Claims, 6 Drawing Sheets

APPARATUS FOR CONTROLLING TRAVELING OF MOWER

BACKGROUND OF THE INVENTION

1. Field of the Invention

The present invention is related to an apparatus for controlling the traveling of a mower, and particularly to an apparatus the traveling speed of which is controlled in such manner that, when grass cut during a mowing operation is conveyed within a duct-like shooter, the shooter is not jammed with the grass.

2. Description of the Prior Art

Conventionally, in the traveling type working machine which works while traveling under power provided by an engine, traveling control has boon performed for automatically controlling the traveling speed according to the work lead condition. The following various improved methods have been proposed for such a working machine.

For instance, in the Japanese Patent Kokai 57-69148 official gazette, a method is shown for preventing unnecessary high-speed revolution at light loads and reduction in the number of revolutions at heavy loads by detecting the torque of a work lead to change the traveling speed of the working machine, thereby reducing fuel consumption. In the Japanese Patent Kokai 60-116008 official gazette. a method is disclosed for detecting the work load condition by the number of revolutions of the a.c. generator driven by the engine of the working machine to change the traveling speed of the working machine, thereby for keeping the appearance of the working trace good and preventing the working vehicle from operating in an overload condition. Further, in the Japanese Patent Kokai 62-69925 official gazette, a method is shown using a sensor for detecting the density of grass to be cut in the front part of the working vehicle and detecting (predicting) the work lead condition based on the sensor output, thereby to effectively utilize the engine output and efficiently perform a grass cutting work.

In the working machine wherein the grass cut in a cutter deck is forcibly conveyed by air blasting by a cutter blade or the like, as in the lawn mower using a grass-bag for instance, the cut grass is conveyed by the air flowing in the shooter, and thus there is a problem that the conveying capacity decreases as tile amount of grass to be cut and conveyed increases and the shooter is apt to be jammed with cut grass.

Once a jam phenomenon has occurred, continuation of the mowing work requires an operation for demounting the shooter and cleaning the portion where the jam has occurred, and then replacing the shooter. The work of removing the mowed grass and cleaning is very cumbersome and dirty, and thus is disliked by the worker and largely decreases the working efficiency.

If a jam occurs simply because the amount of grass mowed is too large, the amount of grass mowed can be decreased by automatically raising the level of the cutter deck to increase the mowing height. However, if the mowing height is controlled to increase each time a jam is to occur and decrease when the jam has been dissolved, then the mowing height is uneven and the appearance of the grass after the work or finish of the work becomes poor.

Besides, it has been found that the shooter is not always jammed with mowed grass because of its excessive amount or lead of the mower. For instance, if grass to be cut is wet and cut grass easily sticks to the inner surface of the shooter, or cut grass is conveyed in a lump within the shooter because of disturbance of the air flow, then a jam is often caused. Once a slight jam has occurred to interfere with the air flow within the shooter, it will soon lead to a heavy jam which makes the work impossible.

From the test result by a study for many years, the present inventors found that the jamming in the shooter with cut, grass is not simply due to a great amount of grass mowed, but is due to a decrease in the quantity of air flowing in the shooter as the density of cut grass extremely increases even temporarily, for instance, when the shooter begins to be jammed with cut grass. The inventors accordingly reached the conclusion that, to prevent the jamming of the shooter, it is important to control the density of cut grass passing within the shooter not to exceed a proper value and continue to ensure an optimum air flow quantity for the amount of cut grass to be conveyed.

SUMMARY OF THE INVENTION

It is an object of the present invention to greatly reduce the jamming of cut grass which easily occurs frequently and causes a cumbersome and dirty cleaning work for resuming the mowing work, thereby providing an apparatus for controlling the traveling of a mower which can perform efficient work with a simple operation.

The present invention is characterized by the provision of conveying state detector means for detecting the conveying state of cut grass in the shooter, and means for decelerating the traveling speed of the working machine while continuing the mowing work by the cutter and the feeding of an air flow to the shooter if the conveying state is more degraded than a jam prevention judgment criterion on the basis of the detection signal of the conveying state detector means.

The present invention is also characterized by the provision of conveying state detector means for detecting the conveying state of grass in the shooter based on the density or amount of cut grass passing through the shooter per unit time, means for decelerating the working machine while maintaining the rotation of the cutter blade for mowing and/or the feeding of the air flow into the shooter if the density exceeds a predetermined threshold value, and correcting the threshold value according to the condition of the grass to be cut; for example, high, degree of overgrowth, degree of dry or wet of the grass.

Since, In the present invention, the working machine is decelerated or stopped if the conveying state of cut grass in the shooter becomes more degraded than the normal state, the amount of mowing and the amount of grass conveyed in the shooter decrease while the amount of air fed into the shooter is maintained as it is or rather increased. Therefore, the cut grass having begun to jam the shooter is blown off in the conveying direction and the jamming of cut grass in the shooter can be prevented as a result.

In addition, if it is supposed that the conveying state in which a jam may occur changes according to the condition of grass to be cut, the jam judgment criterion can be corrected in response to a predicted conveying state, and thus a proper processing for preventing a jam is possible, whereby the working efficiency can be improved.

DETAIL DESCRIPTION OF THE PREFERRED EMBODIMENT

A first embodiment of the present invention is described with reference to the drawings. In this embodiment, the description is made by taking as an example a manned lawn mower as the mower to which the controller is to be applied. In the lawn mower of FIG. 2, lawn mower 1 has front wheel 3 acting as a steerage wheel in the front of vehicle body 2, and rear wheel 4 acting as a driving wheel in the rear of the body 2. The front wheel 3 as a steerage wheel is operated by steering wheel 5 provided in the front of body 2. Provided in the center of body 2 is seat 6, under which an engine (not shown) covered with cover 7 is mounted.

Figure 2:
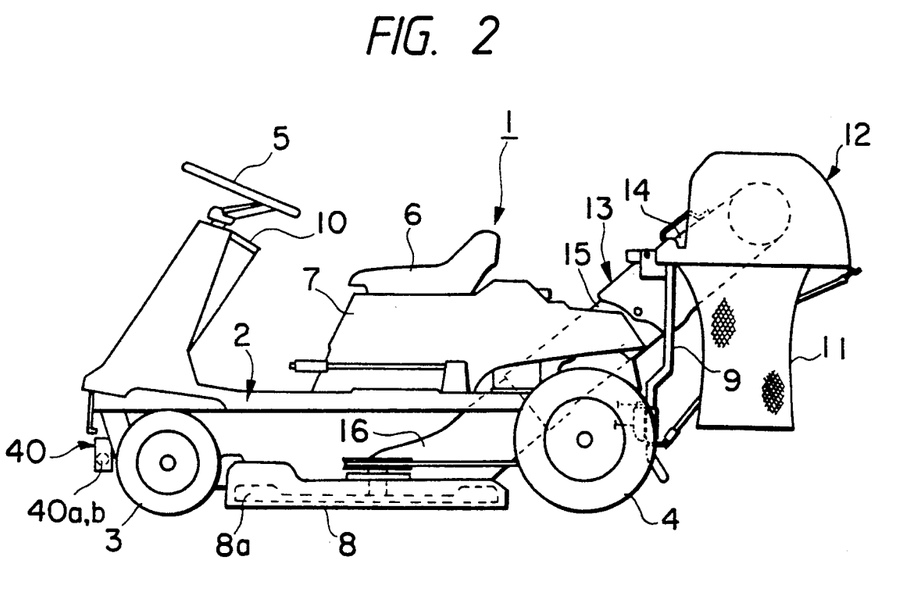
FIG. 2 is a side view of the manned type lawn mower to which the present invention was applied.

Disposed under body 2 is a cutter housing 8 containing a cutter blade 8a. The output shaft of the engine is connected to a non-stage transmission (not shown), and the output shaft of the transmission is connected to the axle shaft of the rear wheel 4. The cutter blade 8a is connected to the input shaft side of the transmission (or the output shaft side of the engine) through a belt. The number of revolutions of cutter blade 8a is controlled by adjusting tile engine speed, or the throttle angle of the engine. The transmission preferably has a brake function at the neutral position, and controls the inclination of the cam plate of a cam plate type variable displacement pump to control the traveling speed and direction of body 2. The details of a transmission suitable for this embodiment are described in the Japanese Patent Kokai 2-306829 official gazette.

Supporting stay 9 is provided in the rear of body 2, and grass-bag 11 is removably mounted on a supporting frame (not shown) horizontally attached with respect to stay 9. Grass-bag 11 is covered with cover 12 which can freely be opened and closed.

A duct-like shooter 13 is provided between the cutter housing 8a and bag 11, and the grass cut by cutter blade 8a is conveyed within shooter 13 by the air flow generated by the rotation of cutter blade 8a, or by the air flow from a separate air blower, and received in grass-bag 11. Shooter 13 consists of upper cylinder body 14, intermediate cylinder body 15 and lower cylinder body 16 which are removable from each other, so that it is easy to disassemble and assemble the shooter for maintenance and cleaning.

Control panel 10 is provided under steering wheel 5 placed in front of seat 6. On control panel 10, a control mode setting switch, a threshold value setting dial for setting a preventive reference value for preventing the shooter jamming, and various indicator lamps, which are later described in detail, are disposed.

Figure 3:
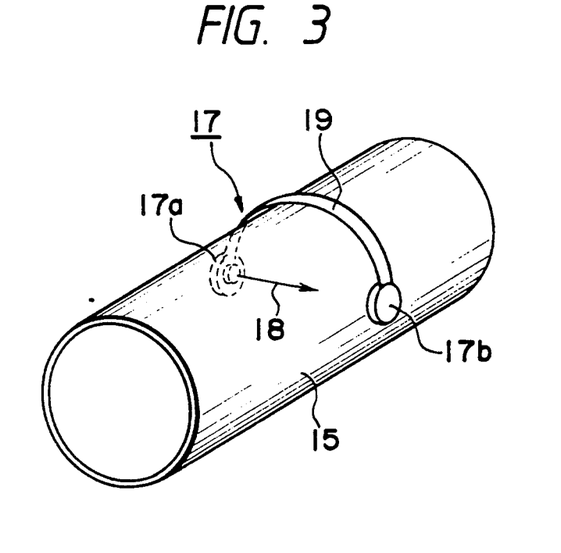
FIG. 3 is a perspective view of a shooter and a light sensor showing a manner of mounting the light sensor for detecting light blocking ratio suitable for the present invention.

Shooter 13 is provided with a light sensor, which detects the conveying state of cut grass in the shooter using the density thereof as a parameter. FIG. 3 is a perspective view showing how the light sensor is disposed on the shooter 13. On the intermediate cylinder body 15, transmission type light sensor 17 consisting of light emitter 17a and light receiver 17b is mounted. Light emitter 17a and light receiver 17b are connected to each other by fitting 19, aligned with through holes which are desirably provided on a diameter of the intermediate cylinder body 15, and positioned so that the light emitting surface and light receiving surface are facing inwardly of cylinder body 15 from the through holes. As the light emitter 17a, for instance, a light emitting diode can be used, and as the light receiver, a photo IC including a photo diode can be used. Light 18 emanating from light emitter 17a is detected at light receiver 17b. The fitting 19 may serve for the supporting of light emitter 17a and light receiver 17b as well as protecting the power and signal lines.

Further, for the second embodiment of the present invention which will be described later, transmission type light sensor 40 consisting of light emitter 40a and light receiver 40b can be provided in the front of body 2 in a manner similar to the light sensor 17 for detecting the condition of grass to be cut. Light emitter 40a and light receiver 40b are placed so that they are spaced apart by a predetermined interval in the width direction of body 2 and their respective light emitting surface and light receiving surface are opposed to each other.

The hardware configuration of the controller of the present invention is described with reference to the block diagram of FIG. 4. To the input side of ECU 20 (Electronic Controller Unit) including a microcomputer and its peripheral devices such as a memory, are connected the transmission type light sensor 17, a threshold value setter (potentiometer) 21 coupled to a threshold value setting dial, a restore switch 22 and a control mode setting switch 23. Second light sensor 40 shown by a dotted line is additionally provided for the second embodiment of the present invention.

Connected to the output side of ECU 20 are a deceleration lamp 24 for indicating that body 2 has been rapidly decelerated or stopped for preventing a jam, a control lamp 25 which lights when the shooter jam preventing mode is selected by control mode setting switch 23, a relay 26 for driving the transmission to automatically decelerate or stop body 2, and a solenoid 27 for restoring the transmission 33 to the neutral position in response to the operation of relay 26.

Figure 4:
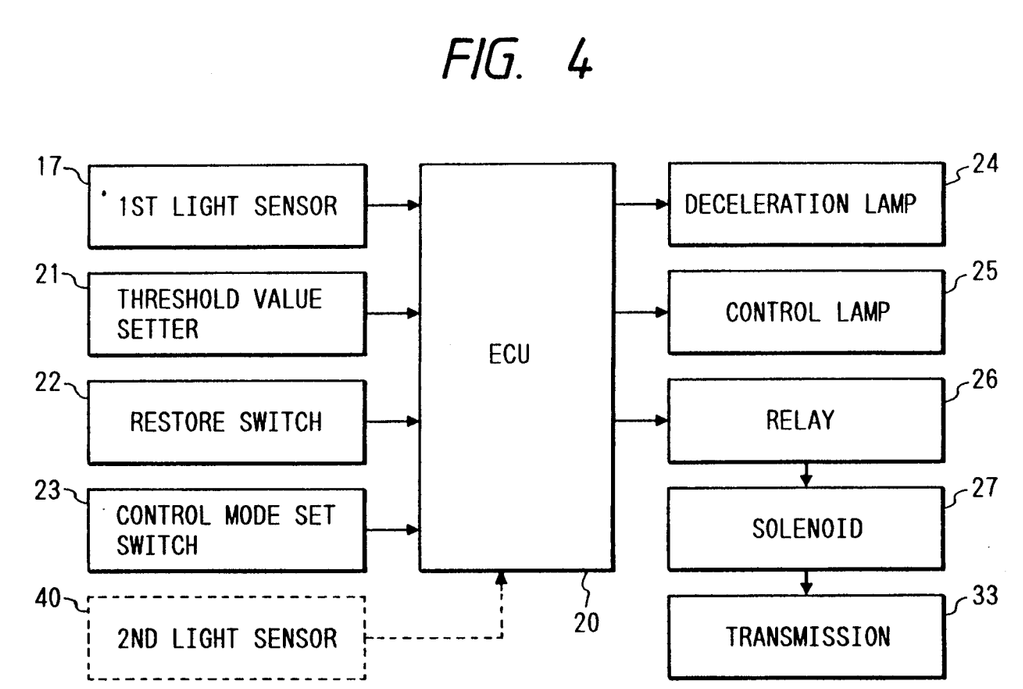
FIG. 4 is a block diagram showing the hardware configuration of the controller shown in FIG. 1.

In the first embodiment of FIG. 4, jam prevention is performed in shooter 13 by the following operation. The light blocking time per unit time (hereinafter referred to as light blocking ratio) is detected on the basis of the output signal of the light receiver 17b in the light sensor 17. Since the light blocking ratio becomes higher as the quantity or density of grass conveyed within shooter 13 increases, it is determined that it becomes easy for a jam to occur if the light blocking ratio exceeds a preset threshold value. If it is determined so, relay 26 is activated to forcibly change the transmission to its neutral position, whereby body 2 is rapidly decelerated and lamp 24 is lit to indicate that fact.

Figure 1:
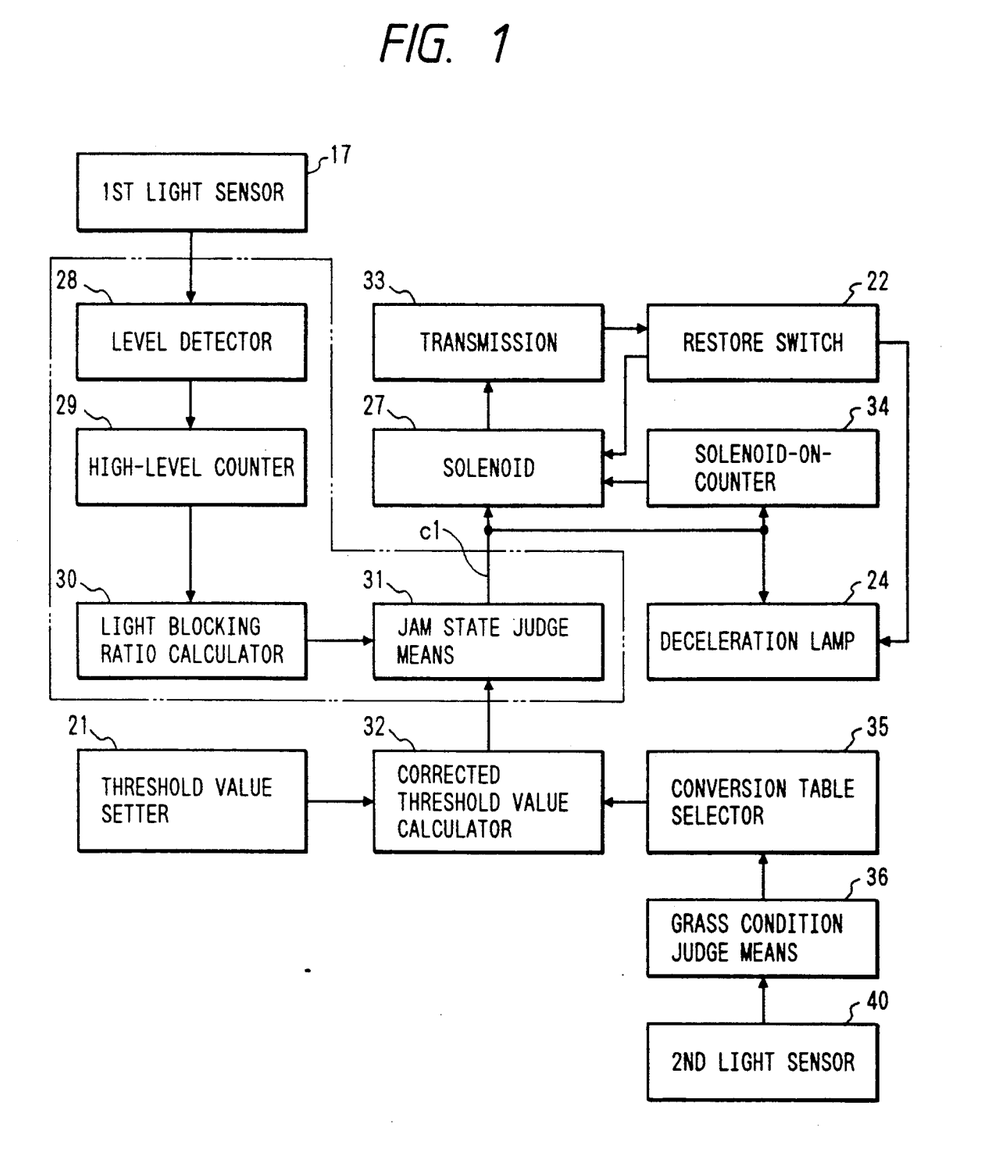
FIG. 1 is a functional block diagram of the principal portion of the controller according to an embodiment of the present invention.

Now, the main function of the controller for performing the processing for preventing a jam is described with reference to the functional block diagram of FIG. 1. Light sensor 17 is designed so that its output signal becomes high (H) if the light reception level of the light receiver is lower than a predetermined value, and low (L) if the light reception level is higher than the predetermined value.

Level detector 28 outputs a detection signal when the output signal of light sensor 17 is high. The detection signal is output for each predetermined sampling time (in this embodiment, 500 usec). High-level counter 29 counts the signals from the level detector 28. The count value is supplied to light blocking ratio calculator 30 for each predetermined calculation period (in this embodiment, 500 msec). Light blocking ratio calculator 30 calculates the generation ratio of the high output signal by light sensor 17, or the light blocking ratio, on the basis of the count value and outputs it to jamming state judge means 31. Alternatively, it is also possible that a capacitor having a specific charging time constant is charged with the output of light sensor 17 and the light blocking ratio is represented by the terminal voltage of the capacitor.

In corrected threshold value calculator 32, a threshold value of the light blocking ratio for light sensor 17, which acts as a judgment reference for preventing a jam, is calculated on the basis of the value of threshold value setter 21. Provided in threshold value calculator 32 are a plurality of threshold value conversion tables (an example of which is described later with reference to FIG. 10) in which different values are set depending on the kinds of grass to be cut and the degree of dry or wet, and one of them is selected by the operator through a selector switch (not shown).

The output value of threshold value setter 21 is converted by the conversion tables in corrected threshold value calculator 32, and output to jamming state judge means 31 as a corrected threshold value. Supplied to jamming state judge means 31 are the light blocking ratio data representative of the conveying state of cut grass conveyed in the shooter and the corrected threshold value calculated in the threshold value calculator for preventing a jam, and both are compared to determine which is greater.

Since the possibility of generation of a jam is high if the calculated light blocking ratio is greater than the corrected threshold value, when this occurs jam prevention command cl is issued, and in response to this command, solenoid 27 and deceleration lamp 24 are energized. When solenoid 27 is energized, transmission 33 is changed to the neutral position and body 2 is rapidly decelerated or stopped. The brake may be automatically applied simultaneously with the transmission change as needed.

Restore switch 22 monitoring whether or not the transmission is in the neutral position turns on when the transmission returns to the neutral position, thereby turning the solenoid 27 off. Then, in response to the returning of transmission 33 to the driving position to turn off the restore switch, deceleration lamp 24 goes off. Thus, restore switch 22 has the function of restoring the jam preventing process mode to the normal working mode.

Instead of providing such a function, solenoid 27 may be turned off by a signal representative of counting up of the count value preset in solenoid-on-counter 34. Whether or not the above jam preventing process is to be performed can be selected by the setting of the control mode setting switch 23 (FIG. 4).

The above operation is described with reference to the flowcharts of FIGS. 5, 6 and 8 as well as the timing chart of FIG. 7.

Figure 5:
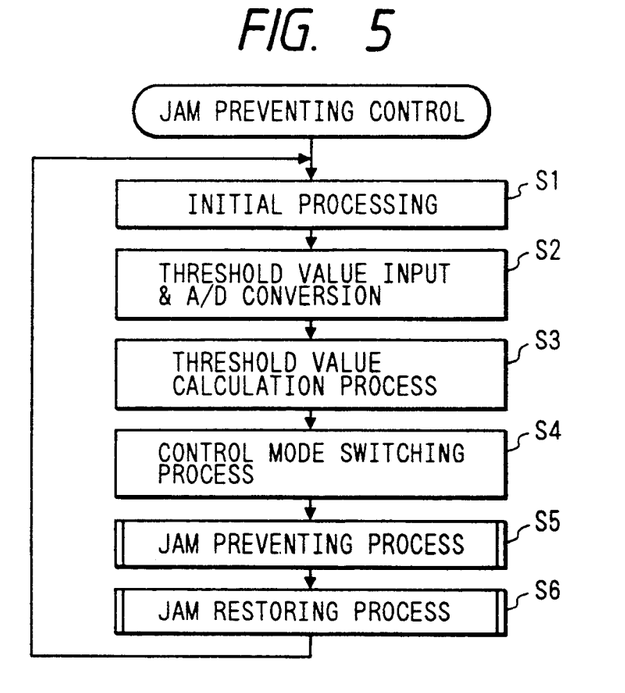
FIG. 5. is a main flowchart of the control for preventing a jam according to the embodiment of the present invention.

The main routine is described according to FIG. 5. In step S1, the initial processings necessary for the microcomputer operation such as setting of various timers and counters, and memory clear are performed. In step S2, an A/D conversion for converting the threshold value (the analog value of the potentiometer) read in from the threshold value setter 21 to a digital value is performed. In step S3, one of a plurality of conversion tables preset in corrected threshold value calculator 32 (ROM) is selected by a selector switch (not shown) according to the kind, degree of dry or wet, and length of grass to be cut, and based on this, a threshed value calculating process for obtaining a corrected threshold value is performed.

In step S4, when the shooter jam preventing mode is selected by control mode setting switch 23, the mode switching process responding to this selection is performed. In the mode switching process, the initial values are set in counter 34 for setting the on-time of solenoid 27 and an interruption timer counter for calculating tile light blocking ratio (not shown), and a flag for lighting the control lamp is set. In addition, the contents of high-level counter 29 for calculating the light blocking ratio and a memory for storing the light blocking ratio (not shown) are cleared.

Figure 6:
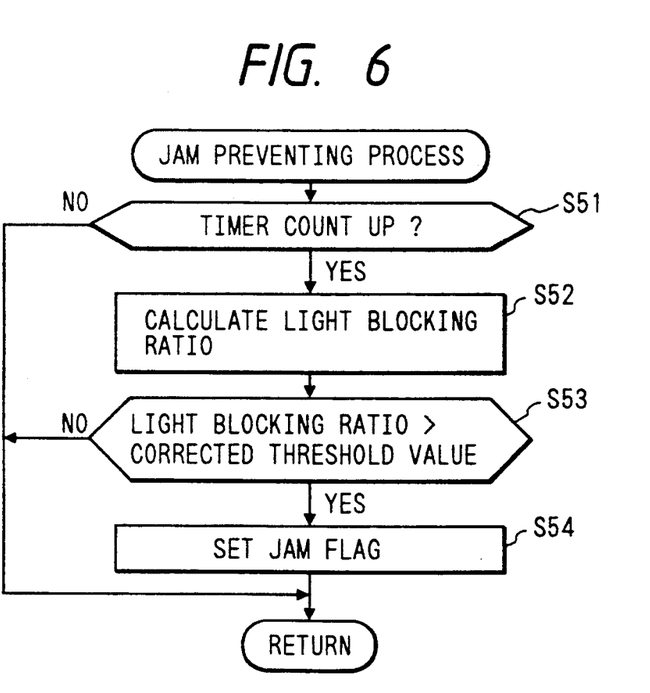
FIG. 6 is a flowchart of the processing for preventing a jam according to the embodiment of the present invention.

In step S5, the jam preventing process shown in the flowchart of FIG. 6 is performed. That is, the count-up of the interruption timer counter for calculating the light blocking ratio is judged (step S51), the light blocking ratio is calculated for each count-up (step S52), and the result is compared with the corrected threshold value (step S53) and the jam flag is set if the light blocking ratio is greater than the threshold value (step S54).

Figure 7:
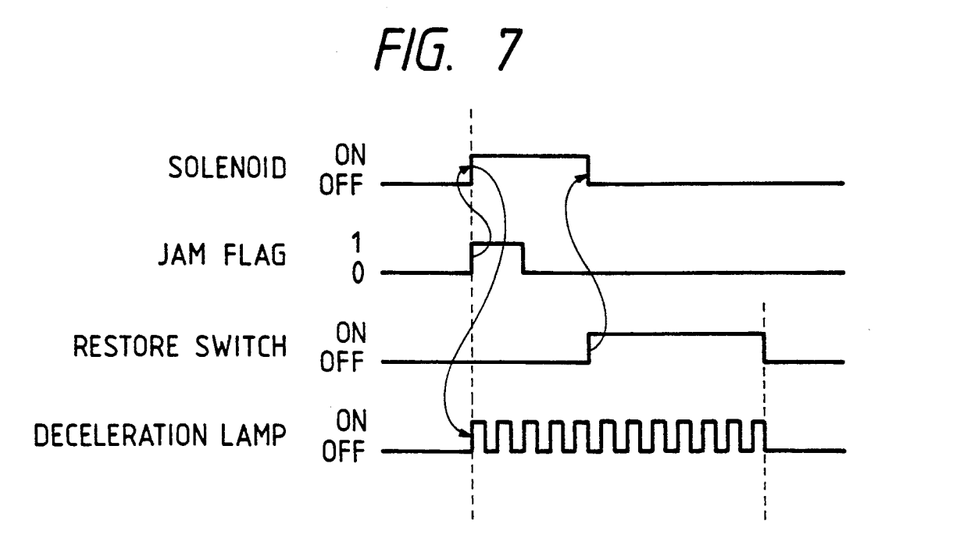
FIG. 7 is a timing chart of the processings for preventing a jam and for restoring.
Figure 8:
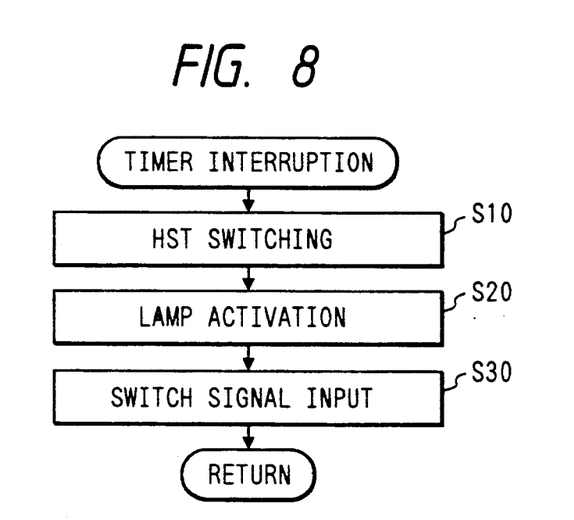
FIG. 8 is a flowchart of the timer interruption routine

In step S6 (FIG. 5), a jam restoring process as shown in the timing chart of FIG. 7 is performed in response to the setting of the jam flag. If the jam flag is set, the driving solenoid 27 of the transmission is turned on to change the transmission to the neutral position. Since body 2 enters a rapid deceleration state when the transmission is changed to the neutral position, deceleration lamp 24 is continuously lit or blinked to indicate that the rapid deceleration is due to the jam preventing process.

Once the transmission has been changed to the neutral position, solenoid 27 need not be held on for a long time and it also consumes power, and thus it is desirable to turn off solenoid 27 by restore switch 22 which turns on when the transmission becomes neutral. Alternatively, solenoid 27 may be turned off when the time preset in the solenoid-on-counter 34 for setting on-time has elapsed, as described above. Restore switch 22 changes to off state from on state if the transmission is operated by the worker to return to the driving position as previously described, deceleration lamp 24 goes off and the original state is restored.

The timer interruption control in which the control of the main routine is interrupted at every predetermined time is described with reference to the flowchart of FIG. 8. The timer interruption is performed, for instance, every 2 msec. In step S10, according to the state of the jam flag based on the jam preventing and jam restore processes, the switching process of the transmission (HST) or on-off control of solenoid 27 is performed. In step S20, lamp activation control for blinking deceleration lamp 24 is performed.

In step S30, a switch signal input process for reading in the on/off state of restore switch 22 and control mode setting switch 23 is performed. In the input process, the switch signal is read in, for instance, on every 10 interruptions per 2 msec or at every 20 msec. In order to prevent an error signal due to chattering or noise from being read in, the input signal level is fetched as an actual input value only when a signal of the same level is consecutively read in three times. In response to the result of the switch signal input process, the provided flag is set or reset for each input.

In addition to the above, the count operation of high-level counter 29 is also performed by timer interruption. That is, the level of light received by the light receiver 17b of light sensor 17 is read in every 500 usec, and counter 29 is incremented when the level of light received is low and the output signal of light receiver 17b is high (H). At each preset calculation period (500 msec), the count value of high-level counter 29 is read in and the light blocking ratio is calculated, and it is judged whether or not the light blocking ratio is greater than the threshold value.

In this embodiment, based on the count value of high-level counter 29 during the calculation period of 500 msec, it is determined whether or not a speed deceleration process as a jam preventing process is performed. In other words, the density of cut grass conveyed within shooter 13 is detected by the light blocking ratio obtained on the basis of the output signal of light sensor 17 provided in shooter 13, and if the density or light blocking ratio is greater than a predetermined value, a jam prevention command is issued to rapidly decelerate the working machine and temporarily stop the mowing of grass, while the rotation of cutter blade 8a and the air blowing into the shooter thereby are continued.

Now, description is made to the second embodiment of the present invention, in which the threshold value set by threshold value setter 21 can be automatically corrected or compensated according to the length and/or degree of wetness of grass which is being actually mowed.

Figure 9:
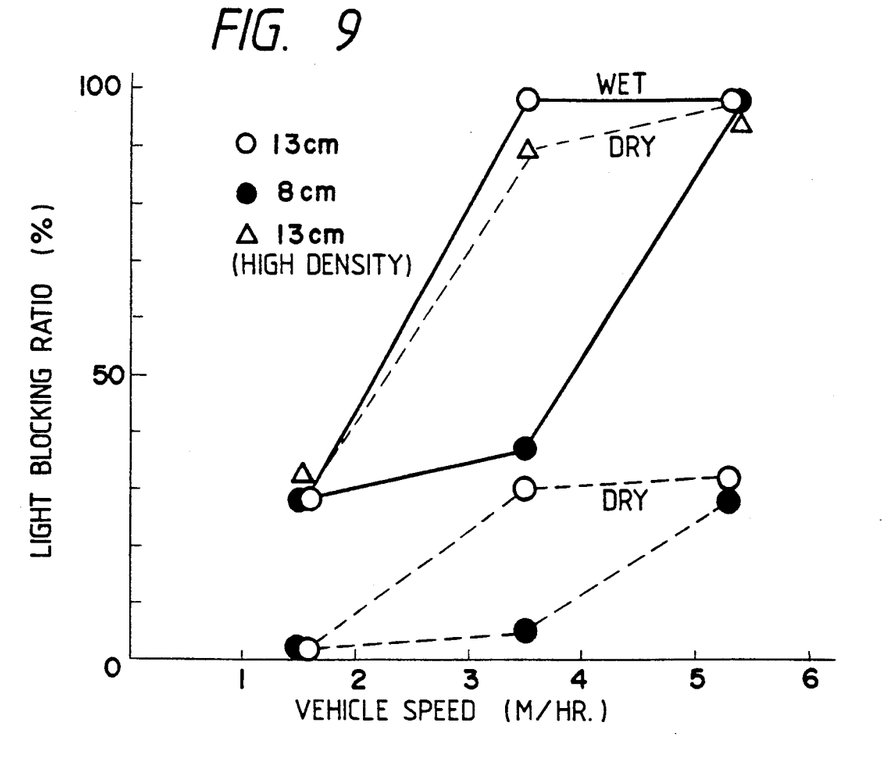
FIG. 9 is a graph showing the relationships between the properties and condition of grass and light blocking ratio and vehicle speed.

The light blocking ratio detected by the light sensor 17, or the density of grass which is cut and conveyed within a unit time, depends on the grass condition, namely, the length, degree of dry or wet, and degree of overgrowth of grass even under the same vehicle speed. The present inventors experimentally confirmed the relationship between the traveling speed of body 2 and tile light blocking ratio for different grass conditions. FIG. 9 is a graph showing the result of a study of the relationship between the vehicle speed and the light blocking ratio for various grass conditions.

In this experiment, the setting level or height of the cutter blade 8a was fixed to 4 cm, and samples were taken for 13 cm-long grass (white circles in the figure) and 8 cm-long grass (black circles in the figure), wet (solid lines in the figure) and dry (dotted lines in the figure) grass, and 13 cm-long dry grass having a high overgrowth density (triangles in the figure). In the same figure, the ordinate represents the light blocking ratio and the abscissa represents the vehicle speed. The wet and dry conditions of the grass adopted in this experiment are typical examples which are relatively frequently experienced in actual mowing operations.

The light blocking ratio increases as the vehicle speed increases because the amount of mowing per unit time increases, but as seen from FIG. 9. the degree of increase is greater for wet grass than for dry grass, and for dry grass having a high overgrowth density the degree of increase in the light blocking ratio is as great as for long and wet grass.

Thus, the light blocking ratio differs depending on the grass conditions, and as the grass length is greater, as the grass is wetter, and as the overgrowth density is higher, the light blocking ratio becomes higher under the same vehicle speed and a jam of cut grass can easily occur.

Accordingly, it is also desirable to correct the threshold value for judging that a jam of cut grass is likely to occur according to the grass condition. It is desirable to set the threshold value of the light blocking ratio low for grass which is tall, wet or has a high overgrowth density under the same vehicle speed. Conversely, if grass which is short, dry or has a low overgrowth density is mowed, the light blocking ratio does not increase so much, and thus the jam preventing operation is not performed as frequently even if the threshold value of the light blocking ratio is set relatively high.

To perform the correction of the threshold value in response to the grass condition, the output signal of the light sensor 40 (FIG. 2) provided under the front of the body is utilized. Light sensor 40 operates in a manner similar to light sensor 17 provided in shooter 13. Since light sensor 40 is placed under the front of body 2, the light blocking ratio obtained according to the output thereof corresponds to the density of the grass at the level at which the light sensor 40 is mounted. That is, if the light blocking ratio is greater than a predetermined value, for instance, it is judged that there is much grass which is taller than the level at which light sensor 40 is mounted. The output of light sensor 40 for detecting the grass condition becomes a high (Ht) level if the light reception level of the light receiver is lower than a predetermined value, and a low (L) level if the light reception level is higher than the predetermined value, as in light sensor 17.

In this embodiment, the length, degree of overgrowth and degree of wet of the grass to be mowed are judged on the basis of the light blocking ratio detected by light sensor 40, and based on the result thereof, a conversion table is automatically selected for correcting the threshold value read in from the threshold value setter 21 to a corrected threshold value to actually be used.

Figure 10:
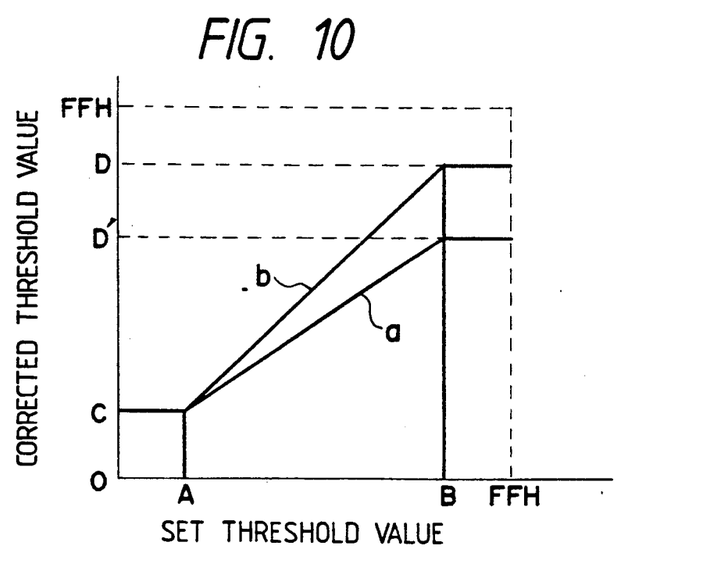
FIG. 10 is a diagram showing an example of the threshold value conversion table.

FIG. 10 is an example of the threshold value conversion table which is stored in corrected threshold value calculator 32. In the same figure, the value of threshold value setter 21 after the A/D conversion is indicated on the abscissa, and the corrected threshold value to be actually compared with the output of light sensor 17 is indicated on the ordinate. For instance, if the grass to be cut is high or the degree of overgrowth thereof is high, that is, if the light blocking ratio of light sensor 40 is relatively high, conversion table a is selected, and if the grass to be cut is low and the light blocking ratio is low, conversion table b is selected, and by these selected tables, the threshold value of the light blocking ratio in shooter 13 is corrected. In the conversion table of FIG. 10, the values of points A, B, C, D and D' are stored. The value of the corrected threshold value can be calculated by an interpolatory calculation. In corrected threshold value calculator 32, a plurality of threshold value conversion tables in which values differing depending on the length of grass are prepared, as in the case of the first embodiment, and they are selected based on the output signal from conversion table selector 35.

The output signal of light sensor 40 is supplied to grass condition judge means 36, in which it is judged on the basis of the light blocking ratio whether the length of the grass is greater or smaller than a predetermined value. The grass condition judge means 36 can be constructed similarly to the jam prevention command generator DT enclosed by a chain line in FIG. 1, and compares the light blocking ratio detected on the basis of the output signal level of sensor 40 with a predetermined threshold value to judge the grass length. Light sensor 40 is freely moved upwardly and downwardly by height adjusting means, not shown. The height judgment signal is supplied to conversion table selector 35, which responds to the height judgment signal to output the table selecting signal to the threshold value calculator 32. In response to the selecting signal, one of the conversion tables in corrected threshold value calculator 32 is selected, and a corrected threshold value is obtained and a jam state judgment is performed by a technique similar to the first embodiment.

Although, in the above described embodiments, the working machine is rapidly decelerated if the light blocking ratio exceeds a predetermined value, the traveling of the working machine may be completely stopped. The threshold values of the light blocking ratio may also be set in multiple stages, and the degree of deceleration may be changed for each stage. For instance, the working machine could be decelerated if the light blocking ratio is rather low, and the traveling of the working machine stopped if the light blocking ratio is extremely low.

As the conversion tables in the corrected threshold value calculator 32, several conversion tables having data of not only the grass length, but also the overgrowth density and degree of wetness of the grass as well as a combination of these with the length as parameters may be previously set. The overgrowth density of the grass can be detected, for instance, by light sensor 40 of the second embodiment, and another sensor for detecting the degree of wet of the grass can be provided in addition to light sensor 40 to use a conversion table having the degree of wet as a parameter. As the sensor for detecting the degree of wet, a capacitance type sensor can be used. The capacitance type sensor comprises at least a pair of electrodes which are oppositely placed at a predetermined interval, for ilower portion e lower portion of body 2, and detects the electrostatic capacitance between the electrodes to detect the degree of dry or wet of the grass existing between the electrodes.

Also as the sensor for detecting the grass length, not only the light sensor shown in the embodiments, but also other well-known sensors such as the capacitance type sensor, ultrasonic sensor and pressure sensitive sensor can be used. It is only needed to provide these sensors in the front of body 2 and detect the condition and properties of the grass to be cut before the cutting.

In the embodiments, one of a plurality of conversion tables is selected according to the grass condition to calculate a corrected threshold value, but a predetermined correction value may be added to or subtracted from the output value of threshold value setter 21, or the output value may be multiplied by a predetermined correction coefficient depending on the grass condition.

Although an example has been shown in which the present invention is applied to a manned type lawn mower, but the present invention is not limited to this and can also be incorporated in an unmanned mower. The present invention can also be applied to a mower in which the feeding of the air flow for conveyance into the shooter is performed from a fan provided separately from the cutter blade.

In accordance with the present invention, since the working machine can be rapidly decelerated to reduce the effective amount of grass being cut if it is feared that the shooter is jammed with grass, the amount of grass to be fed into the shooter can be decreased while simultaneously the cutter blade continues to rotate, so that the cut grass going to jam the shooter can be blown off to the grass-bag by the wind force due to the cutter blade, whereby a jam can be prevented.

Since this can greatly reduce the jamming with cut grass which frequently occurs in prior art mowing machines of this type and causes a cumbersome and dirty cleaning work for resuming the mowing work the mowing work can more efficiently be performed. Since the deceleration lamp can be lit or blinked if there is a rapid deceleration of the traveling speed of the working machine due to the beginning of cut grass jamming, the operator or people around there can be surely informed of the cause of the rapid deceleration.

If the threshold value which is a criterion for judging whether or not a jam prevention is performed is corrected for the grass condition, a jam can be prevented by an optimum judgment criterion suitable for the actual density of grass to be conveyed in the shooter according to the grass to be cut. As a result, deceleration or stopping of the body 2 which is not consistent with the actual condition is eliminated, and an optimum working speed causing no jam can be maintained, whereby the work can be performed without reducing the efficiency.

What is claimed is:

1. An apparatus for controlling the traveling of a mower in which cut grass is conveyed within a shooter by an air flow fed into the shooter along with the grass and received in a grass-bag, said apparatus comprising:
conveying state detector means for detecting the conveying state of cut grass in the shooter,
jam judging means for outputting a jam prevention command when the conveying state represented by a detection signal from the conveying state detector means is more degraded than a jam prevention criterion, and
means responsive to the jam prevention command for decelerating the traveling speed of the mower while continuing the feeding of the air flow to the shooter and the mowing work.

2. An apparatus for controlling the traveling of a mower as set forth in claim 1 wherein said air flow is fed into the shooter by the rotation of a cutter blade for cutting grass.

3. An apparatus for controlling the traveling of a mower as set forth in claim 2 wherein said mower includes an engine connected to a transmission said cutter blade being connected to an input shaft of said transmission and a driving wheel of the mower being connected to an output shaft of the transmission, and means for adjusting said transmission in response to said jam prevention command to decelerate the traveling speed of the mower while the feeding of the air flow to the shooter is continued.

4. An apparatus for controlling the traveling of a mower as set forth in claim 3 wherein said transmission is changed to a neutral position in response to said jam prevention command.

5. An apparatus for controlling the traveling of a mower as set forth in claim 3 wherein said transmission is a hydraulic non-stage transmission.

6. An apparatus for controlling the traveling of a mower as set forth in claim 1 wherein the conveying state of grass in said shooter is detected on the basis of the density of the grass passing within said shooter, and said jam prevention command is output when the detected density exceeds a preset threshold value.

7. An apparatus for controlling the traveling of a mower as set forth in claim 6 wherein the threshold value is set according to the properties and condition of the grass to be cut.

8. An apparatus for controlling the traveling of a mower as set forth in claim 6 including a plurality of threshold value conversion tables containing data relating to different properties and condition of grass to be cut, and means for selecting a particular one of said threshold conversion tables on the basis of the properties and condition of the grass being cut by said mower and utilizing the selected table to correct said preset threshold value, the corrected threshold value being compared with said detected density of the grass passing within said shooter.

9. An apparatus for controlling the traveling of a mower as set forth in claim 6 wherein the density of the grass passing in said shooter is detected on the basis of the output signal of a transmission type light sensor comprising a light emitter and light receiver that are oppositely placed so that the light path connecting them crosses the internal space of said shooter.

10. An apparatus for controlling the traveling of a mower as set forth in claim 1 wherein an alarm is given when the mower is decelerated in response to said jam prevention command while continuing the feeding of the air flow to the shooter, and the alarm is continued till a command for releasing it is supplied.

11. An apparatus for controlling the traveling of a mower as set forth in claim 1 wherein an alarm is given when the mower is decelerated in response to said jam prevention command while continuing the feeding of the air flow to the shooter, and the alarm is continued till the next acceleration operation is performed.

12. An apparatus for controlling the traveling of a mower as set forth in claim 1 wherein the deceleration of said mower is a rapid deceleration leading to the stopping of the mower.

13. An apparatus for controlling the traveling of a mower as set forth in claim 1 wherein said conveying state detector means generates a detection output representing said conveying state of the grass within the shooter on the basis of the density per unit time of tile grass passing in the shooter, and said jam judging means generates a jam prevention command when the detection output representing the conveying state exceeds a predetermined threshold value, said apparatus further comprising means for correcting said threshold value according to the condition of the grass to be cut.

14. An apparatus for controlling the traveling of a mower as set forth in claim 13 wherein said threshold value correcting means corrects said threshold value by selecting one of a plurality of threshold value conversion tables.

15. An apparatus for controlling the traveling of a mower as set forth in claim 14 wherein the selection of said conversion table is performed on the basis of the signal generated from a grass condition detecting sensor provided in the lower portion of the mower and representing the grass condition.

16. An apparatus for controlling the traveling of a mower as set forth in claim 15 wherein said grass condition is at least one of the height, kind, degree of dry or wet, and growth state of the grass to be cut.

* * * * *